United States Patent
Parkvall et al.

(10) Patent No.: US 12,184,460 B2
(45) Date of Patent: *Dec. 31, 2024

(54) NUMEROLOGY-DEPENDENT DOWNLINK CONTROL CHANNEL MAPPING

(71) Applicant: Telefonaktiebolaget LM Ericsson (publ), Stockholm (SE)

(72) Inventors: Stefan Parkvall, Bromma (SE); Robert Baldemair, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/948,515

(22) Filed: Sep. 20, 2022

(65) Prior Publication Data

US 2023/0058968 A1 Feb. 23, 2023

Related U.S. Application Data

(63) Continuation of application No. 16/820,358, filed on Mar. 16, 2020, now Pat. No. 11,489,649, which is a
(Continued)

(51) Int. Cl.
*H04L 27/26* (2006.01)
*H04L 5/00* (2006.01)

(52) U.S. Cl.
CPC ........ *H04L 27/2602* (2013.01); *H04L 5/0023* (2013.01); *H04L 5/0053* (2013.01); *H04L 5/0092* (2013.01); *H04L 27/26025* (2021.01)

(58) Field of Classification Search
CPC .......... H04L 27/2602; H04L 27/26025; H04L 5/0023; H04L 5/0025; H04L 5/0053;
(Continued)

(56) References Cited

U.S. PATENT DOCUMENTS

| 10,637,632 B2 | 4/2020 | Parkvall et al. |
| 2007/0242765 A1 | 10/2007 | Parizhisky et al. |

(Continued)

FOREIGN PATENT DOCUMENTS

| CA | 2972530 A1 | 6/2007 |
| CA | 2767997 A1 | 1/2011 |

(Continued)

OTHER PUBLICATIONS

Ericsson, "R1-1612908: Summary of e-mail discussions on downlink control signaling," 3GPP TSG-RAN WG1 #87, Nov. 14-18, 2016, Reno, Nevada, 37 pages.
(Continued)

*Primary Examiner* — Kevin D Mew
(74) *Attorney, Agent, or Firm* — Withrow & Terranova, PLLC

(57) ABSTRACT

A user equipment performs a method comprising: receiving (S110) system information indicating a current numerology of a control region with configurable numerology; and decoding (S120) the control region in accordance with an assumption of a channel mapping which is selected from at least two predefined channel mappings on the basis of the current numerology. A base station performs a method comprising: transmitting (S210) system information indicating a current numerology of a control region with configurable numerology; generating (S220) a signal using a channel mapping selected from at least two predefined channel mappings; and transmitting (S230) the generated signal in the control region, wherein the channel mapping is selected on the basis of the current numerology of the control region or vice versa.

25 Claims, 6 Drawing Sheets

Related U.S. Application Data continuation of application No. 16/337,865, filed as application No. PCT/SE2017/051140 on Nov. 17, 2017, now Pat. No. 10,637,632.

(60) Provisional application No. 62/423,254, filed on Nov. 17, 2016.

(58) Field of Classification Search
CPC ... H04L 5/0078; H04L 5/0082; H04L 5/0085; H04L 5/0091; H04L 5/0092; H04L 5/0094; H04L 5/0096
See application file for complete search history.

(56) References Cited

U.S. PATENT DOCUMENTS

| | | | |
|---|---|---|---|
| 2007/0274252 A1 | 11/2007 | Zhang et al. | |
| 2009/0067378 A1* | 3/2009 | Luo | H04L 5/0053 370/329 |
| 2009/0088185 A1* | 4/2009 | Beale | H04W 72/20 455/458 |
| 2010/0074204 A1* | 3/2010 | Meylan | H04L 1/1887 714/748 |
| 2010/0232285 A1 | 9/2010 | Lee et al. | |
| 2011/0077035 A1* | 3/2011 | Charipadi | H04B 7/2675 455/507 |
| 2012/0106465 A1 | 5/2012 | Haghighat et al. | |
| 2012/0134446 A1 | 5/2012 | Zhou et al. | |
| 2013/0053035 A1* | 2/2013 | Johansson | H04W 48/16 455/436 |
| 2013/0121301 A1 | 5/2013 | Kim et al. | |
| 2014/0307643 A1 | 10/2014 | Olsson et al. | |
| 2016/0150532 A1 | 5/2016 | Bhushan et al. | |
| 2017/0181149 A1 | 6/2017 | Ang et al. | |
| 2017/0331670 A1 | 11/2017 | Parkvall et al. | |
| 2018/0007673 A1 | 1/2018 | Fwu et al. | |
| 2018/0124727 A1 | 5/2018 | Baldemair et al. | |
| 2018/0176942 A1 | 6/2018 | Kim et al. | |
| 2018/0279264 A1 | 9/2018 | Shimezawa et al. | |
| 2018/0279294 A1 | 9/2018 | Gao et al. | |
| 2018/0279354 A1* | 9/2018 | Nory | H04W 72/23 |
| 2018/0324768 A1* | 11/2018 | Shaheen | H04L 5/0053 |
| 2018/0324789 A1* | 11/2018 | Park | H04L 5/0044 |
| 2018/0368116 A1* | 12/2018 | Liao | H04L 5/0053 |
| 2019/0045533 A1* | 2/2019 | Chatterjee | H04L 5/0053 |
| 2019/0090284 A1 | 3/2019 | Kang et al. | |
| 2019/0097772 A1 | 3/2019 | Yang et al. | |
| 2019/0223204 A1 | 7/2019 | Kim et al. | |
| 2019/0280801 A1 | 9/2019 | Gao et al. | |
| 2019/0342060 A1 | 11/2019 | Parkvall et al. | |
| 2019/0349155 A1* | 11/2019 | Xu | H04L 5/0042 |
| 2019/0380153 A1* | 12/2019 | Damnjanovic | H04L 5/0044 |
| 2021/0014893 A1* | 1/2021 | Park | H04W 72/27 |
| 2021/0022127 A1* | 1/2021 | Xu | H04L 1/189 |

FOREIGN PATENT DOCUMENTS

| | | | | |
|---|---|---|---|---|
| CA | 2750554 A1 | 5/2012 | | |
| CN | 103326977 A | 9/2013 | | |
| CN | 104350695 A | 2/2015 | | |
| CN | 104737479 A | 6/2015 | | |
| CN | 105556887 A | 5/2016 | | |
| EP | 2736296 A1 | 5/2014 | | |
| WO | 2009098572 A1 | 8/2009 | | |
| WO | 2013077517 A1 | 5/2013 | | |
| WO | 2014139562 A1 | 9/2014 | | |
| WO | WO-2016130175 A1 * | 8/2016 | ........... | H04B 7/2656 |
| WO | 2017197125 A1 | 11/2017 | | |
| WO | 2017217903 A1 | 12/2017 | | |
| WO | 2018021370 A1 | 2/2018 | | |
| WO | 2018062462 A1 | 4/2018 | | |
| WO | WO-2018093325 A1 * | 5/2018 | ......... | H04L 27/2602 |
| WO | WO-2021030674 A1 * | 2/2021 | .......... | H04W 52/146 |
| WO | WO-2021133705 A1 * | 7/2021 | .......... | H04L 5/0035 |

OTHER PUBLICATIONS

Examination Report for European Patent Application No. 21167879.2, mailed Feb. 1, 2023, 6 pages.
Author Unknown, "Technical Specification Group Radio Access Network; Study on New Radio (NR) Access Technology Physical Layer Aspects (Release 14)," Technical Specification 38.802, Version 0.3.0, Oct. 2016, 3GPP Organizational Partners, 43 pages.
Ericsson, "R1-163224: Feasibility of Mixing Numerology in an OFDM System," 3GPP TSG RAN WG1 Meeting #84bis, Busan, Korea, Apr. 11-15, 2016, 7 pages.
ETRI, "R1-1612220: Discussion on NR DL control channel structure," 3GPP TSG RAN WG1 Meeting #87, Nov. 14-18, 2016, Reno, Nevada, 3 pages.
Qualcomm Incorporated, "R1-1610177: Dl control channels overview," 3GPP TSG-RAN WG1 #86bis, Oct. 10-14, 2016, Lisbon, Portugal, 6 pages.
Vihriala et al., "Numerology and frame structure for 5G radio access", 2016 IEEE 27th Annual International Symposium on personal, indoor, and mobile radio communications (PIMRC), IEEE, Sep. 4, 2016, p. 1-5.
First Action Interview Pilot Program Pre-Interview Communication for U.S. Appl. No. 16/337,865, mailed Sep. 16, 2019, 4 pages.
First Action Interview Office Action Summary and Applicant-Initiated Interview Summary for U.S. Appl. No. 16/337,865, mailed Oct. 29, 2019, 6 pages.
Notice of Allowance for U.S. Appl. No. 16/337,865, mailed Dec. 26, 2019, 13 pages.
First Office Action for Chinese Patent Application No. 201780071237.0, mailed Mar. 31, 2021, 12 pages.
Second Office Action for Chinese Patent Application No. 201780071237.0, mailed Oct. 18, 2021, 10 pages.
Examination Report for European Patent Application No. 17805301.3, mailed Oct. 30, 2019, 5 pages.
Examination Report for European Patent Application No. 17805301.3, mailed Mar. 9, 2020, 4 pages.
Result of Consultation for European Patent Application No. 17805301.3, mailed Aug. 13, 2020, 3 pages.
Intention to Grant for European Patent Application No. 17805301.3, mailed Aug. 21, 2020, 5 pages.
Extended European Search Report for European Patent Application No. 21167879.2, mailed Jun. 15, 2021, 7 pages.
Examination Report for Indian Patent Application No. 201947019344, mailed Jan. 28, 2021, 6 pages.
Official Action for Russian Patent Application No. 2019118291, mailed Nov. 27, 2019, 10 pages.
Notice of Reasons for Rejection for Japanese Patent Application No. 2019-525842, mailed Aug. 31, 2020, 8 pages.
Decision to Grant for Japanese Patent Application No. 2019-525842, mailed Jun. 1, 2021, 5 pages.
Notice of Reasons for Rejection for Japanese Patent Application No. 2021-108941, mailed Aug. 2, 2022, 10 pages.
International Search Report and Written Opinion for International Patent Application No. PCT/SE2017/051140, mailed Feb. 5, 2018, 9 pages.
Non-Final Office Action for U.S. Appl. No. 16/820,358, mailed Mar. 4, 2021, 8 pages.
Non-Final Office Action for U.S. Appl. No. 16/820,358, mailed Oct. 8, 2021, 7 pages.
Final Office Action for U.S. Appl. No. 16/820,358, mailed Apr. 18, 2022, 14 pages.
Notice of Allowance for U.S. Appl. No. 16/820,358, mailed Jun. 20, 2022, 10 pages.
First Office Action for Chinese Patent Application No. 202210413806.8, mailed Jul. 12, 2023, 12 pages.
Li, Xiao-Wen, et al., "Research of de-resource mapping algorithm for PDCCH based on transmit diversity signal detection in LTE system," Application Research of Computers, vol. 30, Issue 10, Oct. 2013, China Academic Journal Electronic Publishing House, 15 pages.

\* cited by examiner

NUMEROLOGY-DEPENDENT DOWNLINK CONTROL CHANNEL MAPPING

RELATED APPLICATIONS

This application is a continuation of U.S. patent application Ser. No. 16/820,358, filed Mar. 16, 2020, now U.S. Pat. No. 11,489,649, which is a continuation of U.S. patent application Ser. No. 16/337,865, filed Mar. 28, 2019, now U.S. Pat. No. 10,637,632, which is a 35 U.S.C. § 371 national phase filing of International Application No. PCT/SE2017/051140, filed Nov. 17, 2017, which claims the benefit of U.S. Provisional Patent Application No. 62/423,254, filed Nov. 17, 2016, the disclosures of which are hereby incorporated herein by reference in their entireties.

TECHNICAL FIELD

Disclosed herein is a method for enabling multiple numerologies in a network, as well as a user equipment, a base station, a computer program and a computer program device of the network.

BACKGROUND

The fifth generation of mobile telecommunications and wireless technology is not yet fully defined but in an advanced draft stage within $3^{rd}$ Generation Partnership Project (3GPP). It includes work on 5G New Radio (NR) Access Technology. Long term evolution (LTE) terminology is used in this disclosure in a forward looking sense, to include equivalent 5G entities or functionalities although a different term is specified in 5G. A general description of the agreements on 5G NR Access Technology as of November 2016 is contained in 3GPP Technical Report 38.802 v0.3.0 (2016-11).

In 3GPP, there are past and ongoing study items and work items that look into a new radio interface for 5G. Terms for denoting this new and next generation technology have not yet converged, so the terms NR and 5G will be used interchangeably.

One of the first major decisions that the 3GPP TSG RAN WG1 needs to take for NR concerns is what is often denoted with the terms "numerology" and "frame structure". In 3GPP TSG RAN WG1, the term numerology is used to determine important numeric parameters that describe aspects of the OFDM radio interface, such as subcarrier spacing (SCS), OFDM symbol length, cyclic prefix length, number of symbols per subframe or slot, subframe length, and frame length. Some of these terms could also fall under the term frame structure, such as e.g. frame length, number of subframe per frame, subframe length, and location and number of symbols in a slot, frame or subframe that carry control information, and location of channels that carry data. In NR a subframe is 1 ms and establishes a 1 ms clock. Transmissions use slots or mini-slots. A slot consists of 7 or 14 symbols, 7 symbols for subcarrier spacings less than or equal to 60 kHz and 14 symbols for subcarrier spacings greater than 60 kHz.

In addition, the term frame structure can comprise a variety of additional aspects that reflect the structure of frames, subframes and slots, for example the positioning and density of reference signals (pilot signals), placement and structure of control channels, location and length of guard time for uplink to downlink switching (and vice versa) for time division-duplexing (TDD), and time-alignment. Generally, numerology and frame structure encompass a set of fundamental aspects and parameters of the radio interface.

LTE supports a single subcarrier spacing of 15 kHz. For some other parameters in LTE, there is some additional flexibility. For example, it is possible to configure the length of the cyclic prefix and the size of the control region within a subframe. Similarly, LTE can support multiple different frame structures, e.g. for frequency division-duplexing (FDD), TDD, and Narrowband Internet of Things (NB-IoT), respectively.

3GPP TSG RAN WG1 has recently agreed that that it shall be possible support mixed subcarrier spacing on the same carrier in NR. The feasibility of mixed subcarrier spacing was studied e.g. in 3GPP contribution R1-163224, where it was shown that the interference between non-orthogonal subcarriers can be mitigated successfully.

Downlink Control Channel

For NR a proposed frame structure and DL control channel structure is shown in FIG. 3. The first OFDM symbol(s) contains at least Physical Downlink Control Channel (PDCCH). The set of OFDM symbols carrying PDCCHs is known as the control region. The length of the control region may be fixed, be semi-statically configured, or dynamically signaled. Following the OFDM symbol(s) with the control region, the data and Demodulation Reference Signal (DM-RS) start.

PDCCH to one particular user is carried on a subset of OFDM subcarriers. The mapping of PDCCH can either be distributed or localized. In localized mapping, a control channel element (CCE) is formed by resource elements (REs) within a same physical resource block (PRB) pair. In distributed mapping, a CCE is formed by REs within two or more PRB pairs. For simplicity the illustration in FIG. 3 is localized.

PDCCH can carry among others downlink scheduling information indicating DL resources in the same (or also later) slot. FIG. 3 shows two PDCCH and the corresponding two scheduled Physical Downlink Shared Channel (PDSCH), corresponding to upward hashing and horizontal hashing. In addition, a third PDCCH is shown without corresponding PDSCH, e.g. an UL grant, corresponding to downward hashing. A UE detects PDCCH addressed to it and derives from it relevant control information, such as scheduling information. The figure illustrates the case of a control region size of one OFDM symbol. In case the control region extends over multiple OFDM symbols, the mapping of PDCCHs could be done such that one PDCCH is not restricted to a single OFDM symbol but is allowed to span multiple OFDM symbols in the control region (multi-symbol PDCCH mapping). Alternatively, the mapping can be such that one PDCCH is transmitted in one OFDM symbol only (multiple PDCCHs may be transmitted in one OFDM symbol (per-symbol mapping). Normally, one PDCCH is associated with a specific radio network temporary identifier (RNTI). Because a RNTI may be associated with a specific UE, a group of UEs or all UEs of a cell, one PDCCH may be directed to one UE, to all UEs in a cell or to a subgroup of the UEs in the cell.

Per-symbol PDCCH mapping has the benefit of resulting in a time-division multiplexing structure, i.e. PDCCHs in different OFDM symbols can be beamformed in different directions with (analog) beamforming. Multi-symbol PDCCH mapping, on the other hand, may provide benefits in terms of e.g. frequency diversity (different parts of the frequency domain in different OFDM symbols may be used by one PDCCH) and power setting.

Beamforming

Beamforming is a multi-antenna technique to concentrate radiated or received energy into a few directions. At lower frequencies digital beamforming can be performed where the combining of received signals across antenna elements is done in digital domain (on a receiving side) or where the transmit antenna element weights are set in digital domain (on a transmitting side). In a multi-carrier system such as OFDM, beam weights are typically set in frequency domain, i.e. before the transmitter IFFT or after the receiver FFT in an OFDM system. This implies different weights can be applied on different bandwidth portions of the carrier and thus different beams can be realized on different bandwidth portions of the carrier. With digital beamforming it is thus possible to create within one symbol multiple beams pointing to multiple directions/users.

With analog beamforming the beamforming weights are set in the analog domain, either at RF frequency, some intermediate frequency or even baseband. The analog signal is in the time domain, i.e. any formed beam is the same across the complete carrier. With analog beamforming a beam typically covers only one or few users (since in the single beam area only few users are located). To schedule (i.e. point a beam to) multiple users beam sweeping is typically required over a train of (not necessarily contiguous) symbols, each symbol transmitted with different beam weights (and thus beams) covering different users. While with digital beamforming multiple users can be addressed with a single symbol analog beamforming typically requires multiple symbols, see FIG. 4.

Analog beamforming is typically applied in millimeter-wave (mmW) frequencies where large bandwidths are available and many antenna elements are utilized. Processing of large bandwidth requires very fast analog-to-digital converter (ADC) and digital-to-analog converter (DAC) equipment, which are expensive and have relatively high power consumption. In digital beamforming one ADC/DAC is needed per antenna element (group) while in analog beamforming one ADC/DAC is needed per beam and polarization layer. Analog beamforming, where the beamforming weights are applied downstream of the DAC on the transmitting side, is thus simpler and may consume less power, especially for large bandwidth and many antenna elements, such as in the mmW range.

Sending control information to a single user does typically not require a complete OFDM symbol (i.e., the full bandwidth of the symbol is not required), especially at mmW frequencies where considerable bandwidths are available. However, typically only one or few users are within a beam, leading to underutilized OFDM symbols if each OFDM symbol cannot be filled with information to the users within the beam. To reach multiple users with analog beamforming beam sweeping across multiple symbols is applied, and each symbol is potentially underutilized.

Prior art therefore proposes to use wider subcarrier spacings for the DL control channel, relative to the data channel, see FIG. 5. By applying wider subcarrier spacing for the DL control channel, each OFDM symbols becomes shorter and includes fewer subcarriers (for a given bandwidth, an OFDM symbol using $2^n \times 15$ kHz carries $1/2^n$ as many subcarriers as a 15 kHz symbol does). Accordingly, each OFDM symbol is better utilized and the train of symbols gets shorter. However, wider (and thus shorter) subcarriers for DL control is not needed in all systems, e.g. systems using digital beamforming can address multiple users within one symbol. A UE trying to connect to the network does not know which OFDM numerology (e.g. subcarrier spacing but also cyclic prefix length) the network applies for the DL control region.

Furthermore, different PDCCH mappings (per-symbol mapping or multi-symbol mapping) may be preferable in different scenarios.

It is therefore a problem for the UE to know which OFDM numerology is used for the DL control channel and what PDCCH mapping to use.

SUMMARY

An object of embodiments presented herein is how to enable a configurable channel mapping to be used.

According to a first aspect there is presented a method performed by a user equipment (UE) comprising: receiving system information indicating a current numerology of a control region with configurable numerology; and decoding the control region in accordance with an assumption of a channel mapping which is selected from at least two predefined channel mappings on the basis of the current numerology.

If the UE had not had access to information on search space mapping and OFDM numerology, it would have had to blindly detect the numerology and mapping. Blind detection is a complex task which leads to complicated UE implementation and high UE power consumption. This advantage of the first aspect is shared, at least to some extent, by the second and further aspects.

According to a second aspect there is presented a method performed by a base station (BS) comprising: transmitting system information indicating a current numerology of a control region with configurable numerology; and generating a signal using a channel mapping selected from at least two predefined channel mappings; and transmitting the generated signal in the control region. According to this aspect, the channel mapping is selected on the basis of the current numerology of the control region or vice versa.

According to a third aspect there is presented a UE comprising a processor, a communication interface and a computer program product. The computer program product has instructions that, when executed by the processor, cause the UE to: receive system information indicating a current numerology of a control region with configurable numerology; and decode the control region in accordance with an assumption of a channel mapping which is selected from at least two predefined channel mappings on the basis of the current numerology.

According to a fourth aspect there is presented a BS comprising a processor, a communication interface and a computer program product. The computer program product has instructions that, when executed by the processor, cause the BS to: transmit system information indicating a current numerology of a control region with configurable numerology; generate a signal using a channel mapping selected from at least two predefined channel mappings; and transmit the generated signal in the control region. According to these aspects, the channel mapping is selected on the basis of the current numerology of the control region or vice versa.

According to a fifth aspect there is presented a computer program for performing the method according to the first and second aspects.

According to a sixth aspect there is presented a computer program product with a computer-readable medium storing the computer program of the fifth aspect.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, on which.

DETAILED DESCRIPTION

It is noted that the invention may be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Herein the terms user equipment (UE), terminal, handset etc. interchangeably to denote a device that communicates with a network infrastructure. The term should not be construed as to mean any specific type of device, i.e. it applies to them all, and the embodiments described herein are applicable to all devices that use the concerned solution to solve the problems as described. Similarly, a base station (BS) is intended to denote the node in the network infrastructure that communicates with the UE. Different names may be applicable, such as NB, eNB, gNB, and the functionality of the BS may also be distributed in various ways. For example, there could be a radio head terminating parts of the radio protocols and a centralized unit that terminates other parts of the radio protocols. The term BS will refer to all alternative architectures that can implement the concerned invention, and no distinction between such implementations will be made.

Figure 2:
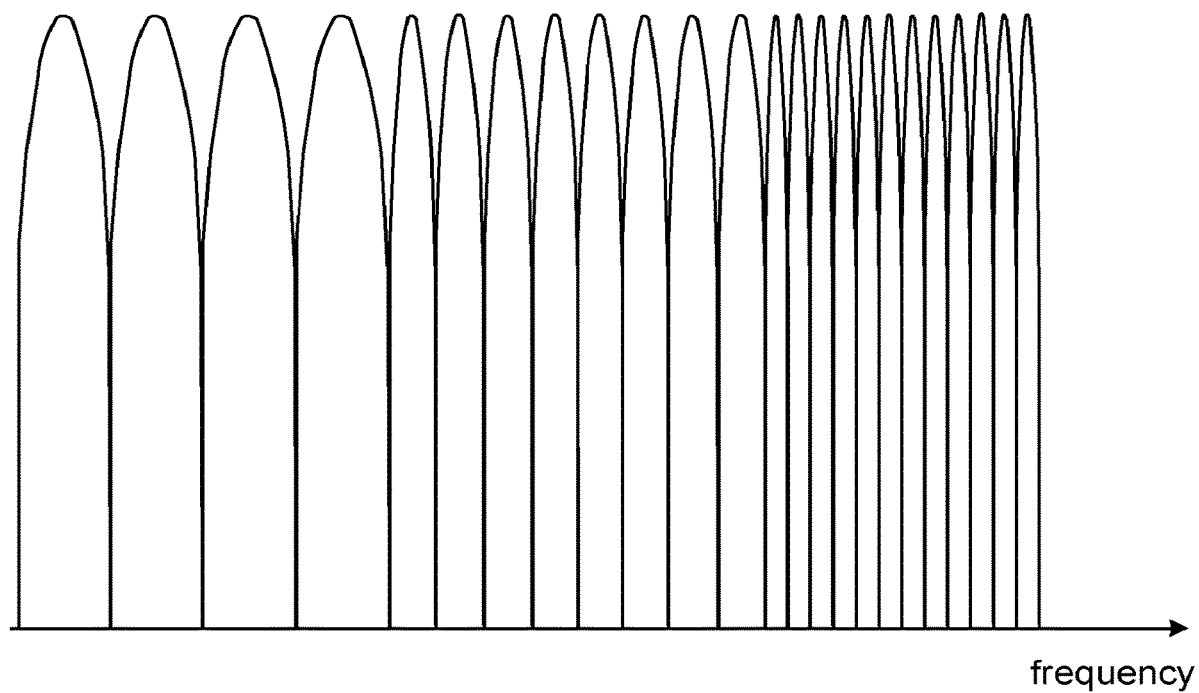
FIG. 2 is a schematic diagram illustrating frequency multiplexing of sub-band regions with different subcarrier spacings.
Figure 3:
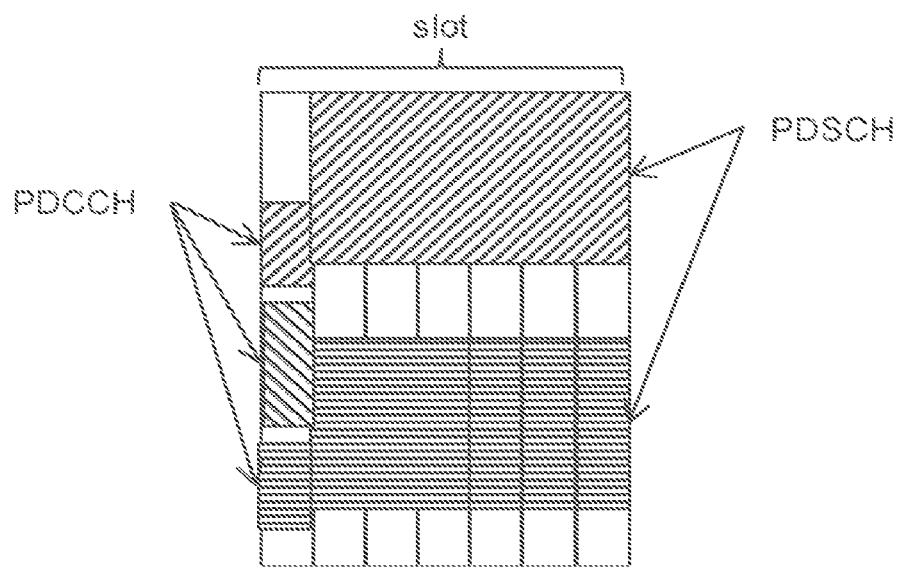
FIG. 3 shows a downlink slot (7 symbols in this example) with control and data, wherein PDSCH is scheduled by the PDCCH.
Figure 4:
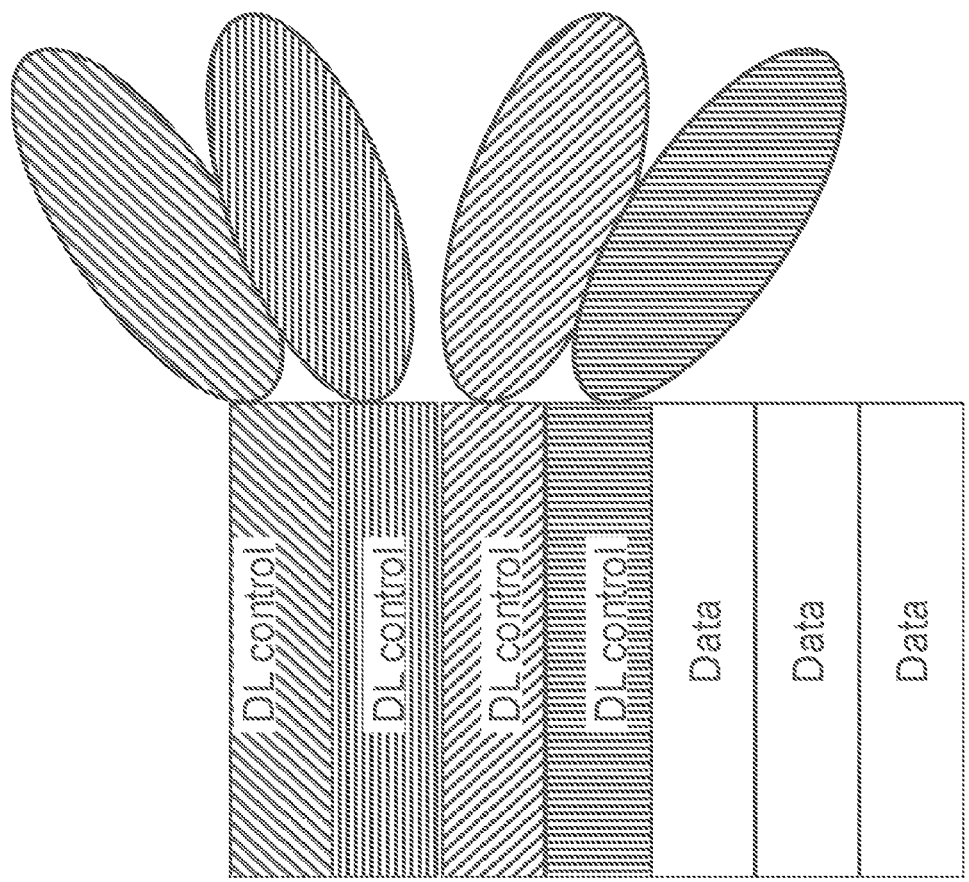
FIG. 4 illustrates beam directions into which consecutive OFDM symbols are beamformed, wherein four symbols are used to create four beams pointing in different directions.
Figure 5:
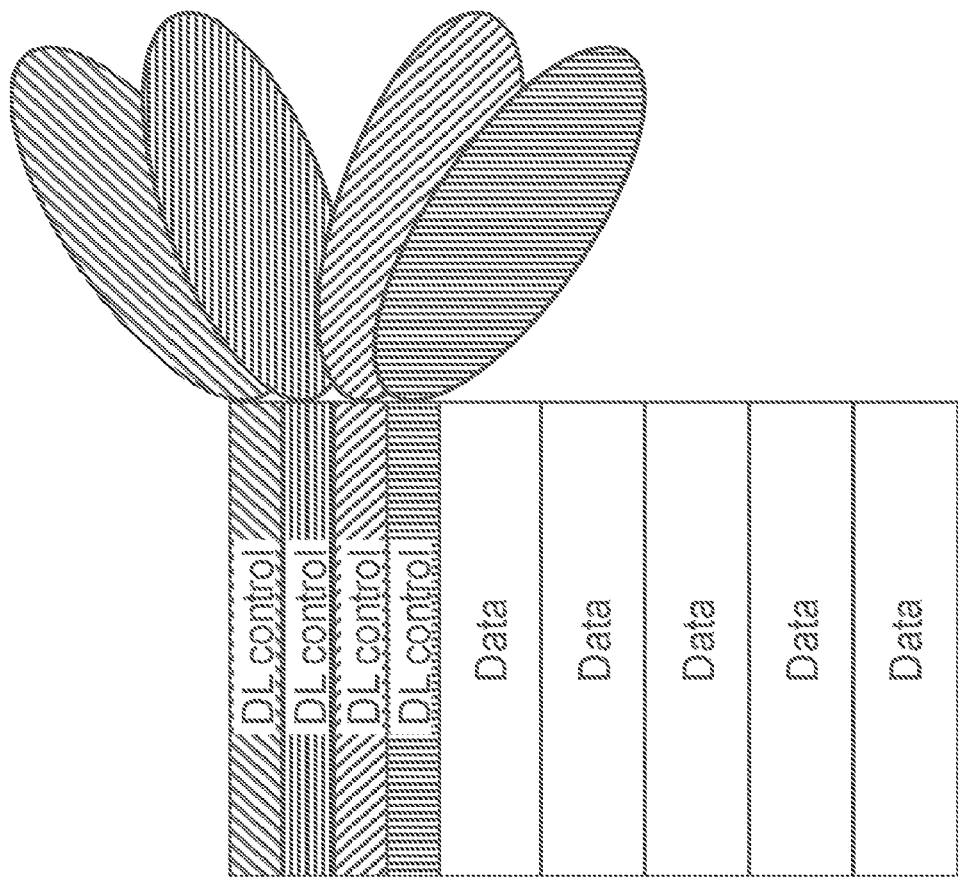
FIG. 5 illustrates beam directions into which consecutive OFDM symbols are beamformed, wherein four symbols are used to create four beams pointing in different directions and wherein the symbols have half length (and thus double length) as data symbols.

FIG. 2 provides a schematic illustration of frequency multiplexing of three sub-band regions with different numerology. In the illustration, there are three different numerologies provided, such as three different carrier frequency portions that use different subcarrier spacing.

It should be noted that many other parameters are likely to be dependent, at least in part, on the subcarrier spacing. For example, the symbol length in OFDM is a function of the subcarrier spacing. The slot length, which is defined in number of symbols or milliseconds, depends for example on selected numerology. Common to many of these parameters is that a receiver needs to know, or will at least greatly benefit from knowing beforehand, what parameters are used by the transmitter when transmitting a signal to the receiver. For example, a UE benefits from knowing the subcarrier spacing used by a transmitting BS, so that the UE can reduce the hypotheses of different subcarrier spacings used by the BS when trying to decode a signal. This applies to many parameters, including but not limited to the ones described above. Some parameters can be either identified by blind decoding, but if there are too many unknown parameters, the identification task will place a heavy processing burden on the UE.

The term "numerology" will herein denote these parameters or at least some of the parameters. More precisely, in a system where one of the enumerated parameters is not configurable, numerology may be understood as not including non-configurable parameters. Occasionally, the expression "a numerology" may denote a set of values to be assigned to the configurable parameters.

Current agreements in 3GPP TSG RAN WG1 includes a subcarrier spacing that scales according to $2^m \times 15$ kHz, with m an integer or preferably a non-negative integer m≥0. It is also agreed that a physical resource block consists of 12 subcarriers. A subframe duration is also fixed to 1 ms. A slot consists of 7 or 14 symbols, 7 symbols for subcarrier spacings less than or equal to 60 kHz and 14 symbols for subcarrier spacings greater than 60 kHz.

As already noted, 3GPP TSG RAN WG1 has agreed that 5G NR should support multiple numerologies within a carrier. Having different numerologies within a carrier can be attractive e.g. to simultaneously meet requirements for low latency for one subset of UEs, and at the same time support good coverage for another set of UEs. In more general terms, different sub-bands on a carrier using different numerologies can then be used for transmissions to and from the different UEs, where the different UEs have different demands on service quality.

However, problems also arise with this flexibility in supporting multiple numerologies on a carrier. In particular a receiver, such as a UE, would greatly benefit from knowing beforehand what numerology that is to be assumed when trying to decode a signal from a transmitter. One challenge is that, when the UE first finds and connects to a cell, it does not necessarily know what numerology is applied on the carrier in the cell, and in particular, it does not know if there are sub-band portions that apply different numerologies.

For the UE, it may be difficult or demanding to implement a solution where the UE knows little or nothing about the downlink signal structure, i.e. the numerology, and has to try out a large number of different assumptions through blind decoding before it can decode the signal from the BS. This problem is particularly severe when a UE is to establish a connection with a BS, i.e. when the UE has not yet received much specific information from the BS about how the BS intends to transmit signals to the UE.

This problem has been addressed by the techniques disclosed in applicant's PCT/SE2016/051083. Here, the network indicates in broadcast information, which is read by the UE before it reads the DL control channel, which OFDM numerology is used for DL control channel. This is especially the case for the numerology of common search space.

For the UE-specific search space it can either be the same numerology as for the common search space (in this case no extra signaling is needed to indicate the numerology of the UE-specific search space) or the UE-specific search space can be separately configured. Configuration of the UE-specific search space is typically done using semi-statically signaling using e.g. RRC signaling.

Having a greater subcarrier spacing for control than for data results in more OFDM symbols being available for the control region. This may be beneficial for analog beamforming. At the same time, for this type of operation, per-symbol PDCCH mapping is required. One possibility is to separately indicate the PDCCH mapping to the UE. Another (preferred) possibility is to link the PDCCH mapping to the control region numerology, for example such that:

same numerology for the control region as for the data region may be interpreted to mean that the UE is to assume multi-symbol PDCCH mapping (and this is used by the network); and/or different (or higher) numerology for the control region compared to the data region may be interpreted to mean that the UE is to assume per-symbol PDCCH mapping (and this is used by the network).

Preferably, the BS and UE apply a pre-agreed criterion based on whether the common search space of the control region has the same numerology as the data region. Alternatively, the criterion is based on whether the UE-specific search space of the control region has the same numerology as the data region.

Generalizing beyond the situation disclosed in PCT/SE2016/051083, embodiments herein may be practiced in any network where the UE, on entering the network, synchronizes to the network and reads (basic) system information. The (basic) system information may be acquired from a broadcast channel (e.g. Master Information Block (MIB) or another channel carrying Minimum System Information). The acquired system information typically provides the UE with information how it can read more system information which is transmitted on the shared channel. Transmissions on the shared channel are announced with the DL control channel PDCCH, for system information typically in the common search space. In order for the UE to be able to read the PDCCH it must know details about the used search space, such as used OFDM numerology (subcarrier spacing or cyclic prefix) and PDCCH mapping.

In order to avoid blind decoding of (common) control channel search space numerology, the UE may be provided with the used OFDM numerology and PDCCH mapping via some channel or signal which it reads prior attempting to read the (common) control channel Such information could for example be transmitted in the synchronization signal (certain sequences or formats of the synchronization signal indicate a certain (common) control channel search space numerology) or preferable via a broadcast channel. The Broadcast Channel BCH carrying the MIB could be transmitted over a Physical Broadcast Channel PBCH. Other signaling could be envisioned as well, e.g. via another Radio Access Technology (RAT) or another type of broadcast channel.

The information indicating the (common) control channel search space numerology could e.g. indicate the used numerology for the search space. In addition or alternatively, it could indicate whether the (common) control channel search space uses the same or another numerology as a data channel, e.g. twice or four times as wide as a data channel. Here also the data channel numerology can be indicated. The PDCCH mapping (per-symbol or multi-symbol) could also be indicated, either separately or (preferably) coupled to the control region numerology relative to the data numerology.

In the same OFDM symbol as the common control channel search space, typically also UE-specific control channel search spaces are configured. One possibility is that the same numerology is used for both common and UE-specific search spaces. Another possibility is that UE-specific search space can be configured separately, in this case extra signaling (e.g. RRC based signaling) is needed to configure the UE-specific search space.

A purpose of using a wider subcarrier spacing for a DL control channel may be to make each OFDM symbol shorter and by that be able to sweep more beams (with multiple symbols) given a fixed time period. Coverage of a channel relates to the energy contained in the received channel, i.e. the longer a channel transmission is the better the coverage is. However, in a deployment where shorter symbols are used for DL control coverage is not an issue and this is acceptable.

In some other deployments coverage of the DL control channel might be more challenging. In some cases, it can even be envisioned that a DL control channel transmission can span multiple OFDM symbols to obtain more energy. In this case it obviously makes little sense to use wider OFDM subcarrier spacings relative to a data channel (and thus shorter symbols) since the energy received with one regular OFDM symbol is already too small and multiple regular OFDM symbols are required to collect sufficient energy. Another embodiment is thus that control channels spanning multiple OFDM symbols are only applicable to the case where the DL control channel subcarrier spacing is the same as for a data channel.

Figure 1:
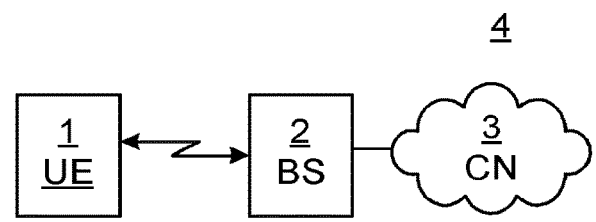
FIG. 1 is a schematic diagram illustrating an environment where embodiments presented herein can be applied.

A network 4, wherein embodiments described herein can be implemented is presented in FIG. 1. A UE 1 is wirelessly connectable to a BS 2. The BS 2 is connected to a core network 3.

Figure 6A:
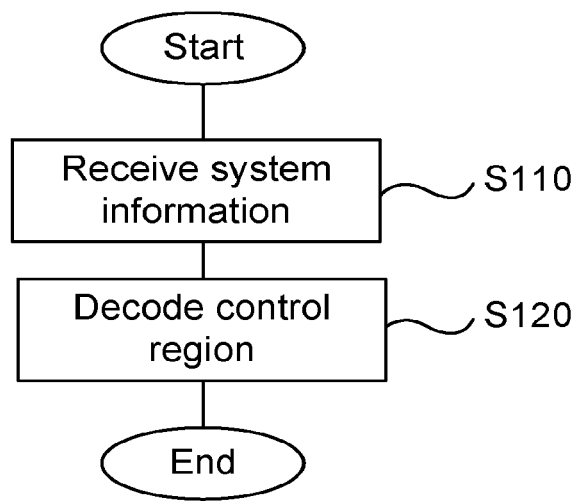
FIGS. 6A and 6B are flowcharts illustrating method embodiments presented herein.
Figure 6B:
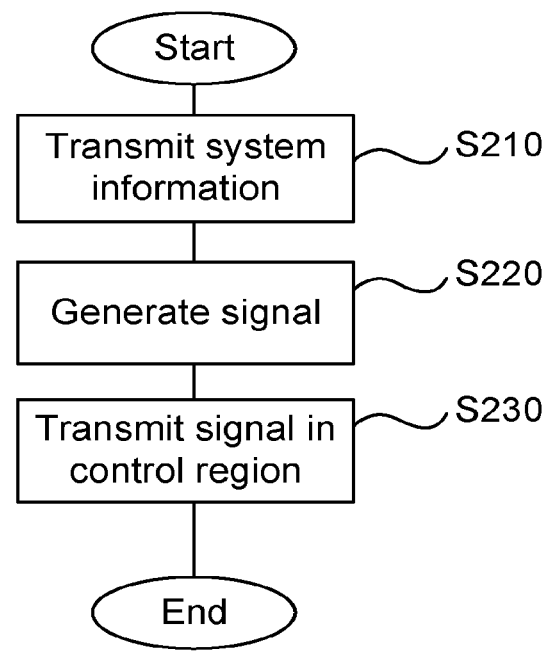

A method, according to an embodiment, for enabling use of different channel mappings is illustrated in FIG. 6A. A method, according to an embodiment, for enabling use of different channel mappings is illustrated in FIG. 6B.

Figure 7:
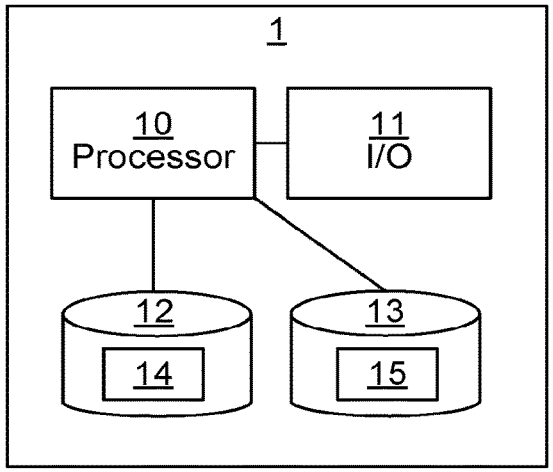
FIGS. 7 and 8 are schematic diagrams illustrating some components of devices presented herein.

A UE according to an embodiment is presented with reference to FIG. 7. The UE 1 comprises a processor 10, a communication interface 11 and a computer program product 12, 13. The computer program product stores instructions that, when executed by the processor, cause the UE to perform the steps shown in FIG. 6A. The processor 10 may be implemented as processing circuitry. In an alternative implementation, the processor 10 and computer program product 12, 13 are replaced by processing circuitry configured to perform the steps shown in FIG. 6A.

Figure 8:
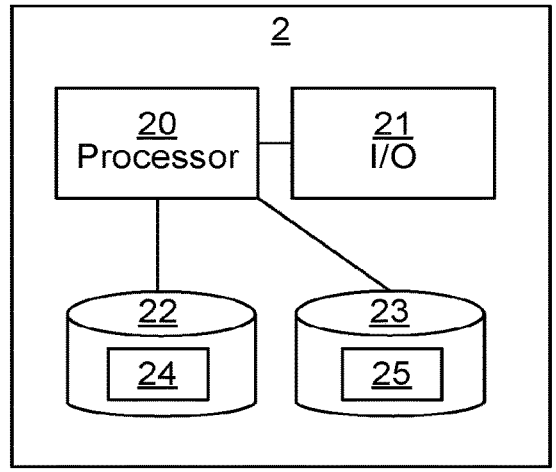

A BS according to an embodiment is presented with reference to FIG. 8. The BS 2 comprises a processor 20, a communication interface 21 and a computer program product 22, 23. The computer program product stores instructions that, when executed by the processor, cause the BS to perform the steps shown in FIG. 6B. The processor 20 may be implemented as processing circuitry. In an alternative implementation, the processor 20 and the computer program product 22, 23 are replaced by processing circuitry configured to perform the steps shown in FIG. 6B.

Figure 9:
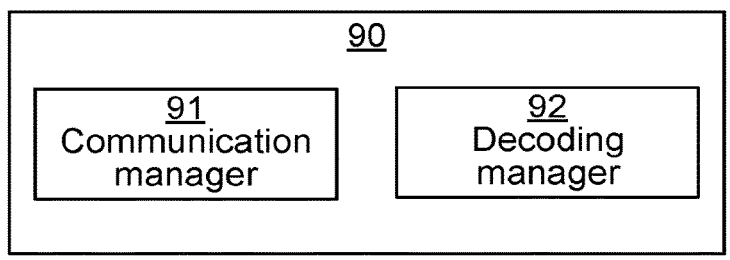
FIGS. 9 and 10 are schematic diagrams showing functional modules of devices presented herein.

A UE according to an embodiment is presented with reference to FIG. 9. The UE 90 comprises a communication manager 91 and a decoding manager 92. With reference to FIG. 6A, the communication manager 91 is for performing step S110 and the decoding manager 92 is for performing step S120.

Figure 10:
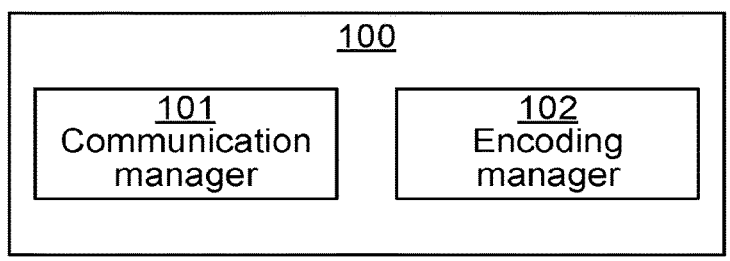

A BS according to an embodiment is presented with reference to FIG. 10. The BS 100 comprises a communication manager 101 and an encoding manager 102. With reference to FIG. 6B, the communication manager is for performing steps S5210 and S230 and the encoding manager 102 is for performing step S220.

A computer program 14, 15 according to an embodiment is provided. The computer program comprises computer program code which, when run on a UE, causes the UE to perform the method shown in FIG. 6A.

A computer program 24, 25 according to an embodiment is provided. The computer program comprises computer program code which, when run on a BS, causes the BS to perform the method shown in FIG. 6B.

A computer program product 12, 13 (FIG. 7), 22, 23 (FIG. 8) comprising a computer program 14, 15 (FIG. 7), 24, 25 (FIG. 8) and a computer readable storage means on which the computer program 14, 15, 24, 25 is stored, are also provided.

FIG. 7 is a schematic diagram showing some components of the UE 1. The processor 10 may be provided using any combination of one or more of a suitable central processing unit, CPU, multiprocessor, microcontroller, digital signal processor, DSP, application specific integrated circuit etc., capable of executing software instructions of a computer program 14 stored in a memory. The memory can thus be considered to be or form part of the computer program product 12. The processor 10 may be configured to execute the method described herein with reference to FIG. 6A.

The memory may be any combination of random access memory, RAM, and read only memory, ROM. The memory may also comprise persistent storage, which, for example, can be any single one or combination of magnetic memory, optical memory, solid state memory or even remotely mounted memory.

A second computer program product 13 in the form of a data memory may also be provided, e.g. for reading and/or storing data during execution of software instructions in the processor 10. The data memory can be any combination of random access memory, RAM, and read only memory, ROM, and may also comprise persistent storage, which, for example, can be any single one or combination of magnetic memory, optical memory, solid state memory or even remotely mounted memory. The data memory may e.g. hold other software instructions 15, to improve functionality for the UE 1.

FIG. 9 is a schematic diagram showing functional blocks of the UE 1. The modules may be implemented as only software instructions such as a computer program executing in the cache server or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the steps in the methods illustrated in FIG. 6A, comprising a communication manager 91 and a decoding manager 92. In the embodiments where one or more of the modules are implemented by a computer program, it shall be understood that these modules do not necessarily correspond to process modules, but can be written as instructions according to a programming language in which they would be implemented, since some programming languages do not typically contain process modules.

The communication manager 91 can e.g. be implemented by the processor 10 of FIG. 7, when running the computer program. The decoding manager 92 can e.g. be implemented by the processor 10 of FIG. 7, when running the computer program.

FIG. 8 is a schematic diagram showing some components of the base station 2. A processor 20 may be provided using any combination of one or more of a suitable central processing unit, CPU, multiprocessor, microcontroller, digital signal processor, DSP, application specific integrated circuit etc., capable of executing software instructions of a computer program 24 stored in a memory. The memory can thus be considered to be or form part of the computer program product 22. The processor 20 may be configured to execute method described herein with reference to FIG. 6B.

The memory may be any combination of random access memory, RAM, and read only memory, ROM. The memory may also comprise persistent storage, which, for example, can be any single one or combination of magnetic memory, optical memory, solid state memory or even remotely mounted memory.

A second computer program product 23 in the form of a data memory may also be provided, e.g. for reading and/or storing data during execution of software instructions in the processor 20. The data memory can be any combination of random access memory, RAM, and read only memory, ROM, and may also comprise persistent storage, which, for example, can be any single one or combination of magnetic memory, optical memory, solid state memory or even remotely mounted memory. The data memory may e.g. hold other software instructions 25, to improve functionality for the BS 2.

FIG. 10 is a schematic diagram showing functional blocks of the BS 2. The modules may be implemented as only software instructions such as a computer program executing in the cache server or only hardware, such as application-specific integrated circuits, field programmable gate arrays, discrete logical components, transceivers, etc. or as a combination thereof. In an alternative embodiment, some of the functional blocks may be implemented by software and other by hardware. The modules correspond to the steps in the method illustrated in FIG. 6B, comprising a communication manager 101 and an encoding manager 102. In the embodiments where one or more of the modules are implemented by a computer program, it shall be understood that these modules do not necessarily correspond to process modules, but can be written as instructions according to a programming language in which they would be implemented, since some programming languages do not typically contain process modules.

The communication manager 101 can e.g. be implemented by the processor 20 of FIG. 8, when running the computer program. The encoding manager 102 can e.g. be implemented by the processor 20 of FIG. 8, when running the computer program.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method implemented in a user equipment, UE, comprising:
   receiving system information indicating a current numerology of a control region with configurable numerology; and
   decoding the control region in accordance with a channel mapping which is selected from channel mappings on the basis of the current numerology.

2. The method of claim 1, further comprising comparing a numerology of a data region and said current numerology of the control region,
   wherein the channel mapping is selected on the basis of an outcome of the comparison.

3. The method of claim 2, further comprising receiving an indication of the numerology of the data region.

4. The method of claim 3, wherein the comparison pertains to numerologies of a data region and a control region of a same slot.

5. The method of claim 4, wherein the system information is received on a broadcast channel.

6. The method of claim 5, wherein:
   the control region comprises a common portion and a UE-specific portion, wherein a numerology of one of the portions is configurable independently of a numerology of the other one of the portions; and
   said comparison pertains to numerologies of the data region and a common portion of the control region.

7. The method of claim 6, wherein the channel mappings include multi-symbol mapping and per-symbol mapping.

8. The method of claim 7, wherein multi-symbol mapping is selected in the absence of a comparison of a numerology of a data region and the current numerology of the control region.

9. The method of claim 7, wherein per-symbol mapping is selected if the numerology of the data region and the current numerology of the control region are different.

10. The method of claim 9, wherein per-symbol mapping is selected if the current numerology of the control region prescribes a greater subcarrier spacing than the numerology of the data region.

11. The method of claim 10, wherein multi-symbol mapping is selected if the numerology of the data region and the current numerology of the control region are equal or equivalent.

12. The method of claim 11, wherein per-symbol mapping entails that each physical downlink control channel, PDCCH, is contained in one OFDM symbol.

13. The method of claim 12, wherein multi-symbol mapping entails that a physical downlink control channel, PDCCH, may exceed one OFDM symbol.

14. A method implemented in a base station, BS, comprising:
   transmitting system information indicating a current numerology of a control region with configurable numerology;
   generating a signal using a channel mapping selected from channel mappings; and
   transmitting the generated signal in the control region,
   wherein the channel mapping is selected on the basis of the current numerology of the control region or vice versa.

15. The method of claim 14, further comprising transmitting an indication of a numerology of a data region.

16. The method of claim 15, wherein the system information is transmitted on a broadcast channel.

17. The method of claim 16, wherein the channel mappings include multi-symbol mapping and per-symbol mapping.

18. The method of claim 17, wherein multi-symbol mapping is selected in instances for which the BS does not transmit an indication of a numerology of a data region.

19. The method of claim 17, wherein per-symbol mapping is selected if a numerology of a data region and the current numerology of the control region are different.

20. The method of claim 19, wherein per-symbol mapping is selected if the current numerology of the control region prescribes a greater subcarrier spacing than the numerology of the data region.

21. The method of claim 20, wherein multi-symbol mapping is selected if a numerology of a data region and the current numerology of the control region are equal or equivalent.

22. The method of claim 21, wherein per-symbol mapping entails that each physical downlink control channel, PDCCH, is contained in one OFDM symbol.

23. The method of claim 22, wherein multi-symbol mapping entails that a physical downlink control channel, PDCCH, may exceed one OFDM symbol.

24. A user equipment comprising:
   a processor;
   a communication interface; and
   a computer program product storing instructions that, when executed by the processor, cause the UE to:
      receive system information indicating a current numerology of a control region with configurable numerology; and
      decode the control region in accordance with a channel mapping which is selected channel mappings on the basis of the current numerology.

25. A base station comprising:
   a processor;
   a communication interface; and
   a computer program product storing instructions that, when executed by the processor, cause the BS to:
   transmit system information indicating a current numerology of a control region with configurable numerology;
   generate a signal using a channel mapping selected from channel mappings; and
   transmit the generated signal in the control region,
   wherein the channel mapping is selected on the basis of the current numerology of the control region or vice versa.

* * * * *

UNITED STATES PATENT AND TRADEMARK OFFICE
CERTIFICATE OF CORRECTION

PATENT NO. : 12,184,460 B2
APPLICATION NO. : 17/948515
DATED : December 31, 2024
INVENTOR(S) : Parkvall et al.

It is certified that error appears in the above-identified patent and that said Letters Patent is hereby corrected as shown below:

In the Specification

In Column 9, Line 5, delete "S5210" and insert -- S210 --, therefor.

In Column 10, Line 33, delete "software instructions 25," and insert -- software instructions of a computer program 25, --, therefor.

Signed and Sealed this
Nineteenth Day of August, 2025

Coke Morgan Stewart
*Acting Director of the United States Patent and Trademark Office*